(12) United States Patent
Yamazoe et al.

(10) Patent No.: US 7,821,648 B2
(45) Date of Patent: Oct. 26, 2010

(54) MEASUREMENT METHOD, A MEASUREMENT APPARATUS, AND A COMPUTER-READABLE RECORDING MEDIUM

(75) Inventors: Kenji Yamazoe, Berkeley, CA (US); Yuki Oshima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 12/342,631

(22) Filed: Dec. 23, 2008

(65) Prior Publication Data

US 2009/0168075 A1    Jul. 2, 2009

(30) Foreign Application Priority Data

Dec. 28, 2007    (JP) .............................. 2007-341369

(51) Int. Cl.
*G01B 11/02*    (2006.01)
(52) U.S. Cl. ....................... 356/515; 356/512
(58) Field of Classification Search ................ 356/511, 356/512, 515, 489, 495
See application file for complete search history.

(56) References Cited

U.S. PATENT DOCUMENTS

| | | | |
|---|---|---|---|
| 5,880,841 A * | 3/1999 | Marron et al. | 356/512 |
| 5,926,277 A * | 7/1999 | Marron et al. | 356/512 |
| 6,744,522 B2 * | 6/2004 | De Groot et al. | 356/503 |
| 6,781,700 B2 | 8/2004 | Küchel | |
| 7,365,858 B2 * | 4/2008 | Fang-Yen et al. | 356/489 |
| 2002/0145739 A1 * | 10/2002 | De Groot et al. | 356/503 |
| 2009/0109444 A1 * | 4/2009 | Wan | 356/511 |
| 2009/0168075 A1 * | 7/2009 | Yamazoe et al. | 356/511 |
| 2010/0094135 A1 * | 4/2010 | Fang-Yen et al. | 600/476 |
| 2010/0150467 A1 * | 6/2010 | Zhao et al. | 382/264 |

FOREIGN PATENT DOCUMENTS

JP    2004-045168 A    2/2004

* cited by examiner

*Primary Examiner*—Patrick J Connolly
(74) *Attorney, Agent, or Firm*—Canon U.S.A., Inc., IP Division

(57) ABSTRACT

A measurement method for measuring a shape of a target using an interference pattern includes the steps of converting a first interference pattern into a first shape of the target (S103 to S105), obtaining a second interference pattern at a position where the target moves in an optical axis direction of the reference surface (S107, S108), unwrapping the second interference pattern after aligning a phase of the first interference pattern with a phase of the second interference pattern (S109), converting the unwrapped second interference pattern into a second shape of the target (S110), determining whether or not the first shape of the target coincides with the second shape (S111), and calculating the shape of the target by adding the integral multiple of a wavelength of the light source to the unwrapped second interference pattern if the first shape does not coincide with the second shape (S112).

8 Claims, 9 Drawing Sheets

MEASUREMENT METHOD, A MEASUREMENT APPARATUS, AND A COMPUTER-READABLE RECORDING MEDIUM

BACKGROUND OF THE INVENTION

1. Field of the Invention

The present invention relates to a measurement method and a measurement apparatus which measure a shape of a target, and a recording medium recordable by a computer in which a program which makes the computer execute a measurement of a shape of a target is recorded.

2. Description of the Related Art

Generally, a plurality of lenses are used in a camera lens or a projection optical system of a semiconductor exposure apparatus. It is because an aberration cannot be removed by only one lens. For example, a camera lens around 10 years ago was constituted by around 7 lenses. A semiconductor exposure apparatus around 10 years ago used around 30 lenses. In order to reduce the number of lenses to lower the cost, and realize a low aberration and a small space of the lens group, an aspherical surface lens is necessary. In recent years, the aspherical surface lens is also mounted in the camera lens or an optical system of the semiconductor exposure apparatus, and reducing the cost, lowering the aberration, and narrowing the space of the lens group are proceeding.

While the aspherical surface lens has a variety of advantages, there is a problem that the required process and the measurement are difficult. Therefore, the process of the aspherical surface and the measurement of the shape of the aspherical surface are fields in which researches are actively performed in recent years.

The measurement of the aspherical surface shape can be categorized into two types of method. A first measurement method is a contact mode method which measures a shape by tracing a surface using what is called a probe. Although the contact mode method can be widely applied, it takes much time for the measurement because it measures points on the surface one by one using the probe. Furthermore, the surface may get scratched by the contact of the probe. A second method is a non-contact mode and a measurement of an aspherical surface using an interferometer is typical.

As an aspherical surface measurement using an interferometer, there is a method in which a target is scanned in an optical axis direction. The method obtains a plurality of interference patterns while the target is scanned in the optical axis direction and processes each of the interference patterns. Subsequently, a complete shape is calculated. As a typical method, for example, there are U.S. Pat. No. 6,781,700 and Japanese Patent Laid-Open No. 2004-45168.

U.S. Pat. No. 6,781,700 discloses a measurement method of an aspherical surface shape which has an axisymmetric setting value. When a target is scanned in an optical axis direction, an annular interference pattern appears only in a certain area. Thus, in U.S. Pat. No. 6,781,700, the aspherical surface shape is calculated from the interference pattern by mathematically associating the interference pattern with the shape of the target. However, in this method, a highly-controlled interferometer and an advanced interference pattern processing is needed.

Japanese Patent Laid-Open No. 2004-45168 also discloses a measurement method of an aspherical surface shape which has an axisymmetric setting value. In this method, a plurality of annular interference patterns which appear in scanning a target in an optical axis direction are obtained. After an offset component of each of the interference patterns is removed, the interference patterns are corrected by $2\pi n$ ("n" is an integer) to join them. According to the technology disclosed in Japanese Patent Laid-Open No. 2004-45168, the shape can be calculated by an easy method. However, as described later in detail, it is an approximate solution. Therefore, when an amount of scanning is large, the assumed approximation does not hold true and the measurement accuracy is deteriorated.

Thus, when the aspherical surface shape is measured by the interferometer, an advanced processing or an approximate calculation was necessary.

BRIEF SUMMARY OF THE INVENTION

The present invention provides an interference measurement method and an interference measurement apparatus which can measure a shape of an aspherical surface with simple processing without an approximate calculation. The present invention also provides a computer-readable recording medium in which a program used for the interference measurement method is recorded.

A measurement method as one aspect of the present invention is a measurement method for measuring a shape of a target using an interference pattern formed by reference light from a reference surface and light from the target by light from a light source. The measurement method includes the steps of converting a first interference pattern into a first shape of the target after obtaining the first interference pattern of the target, obtaining a second interference pattern at a position where the target moves in an optical axis direction of the reference surface, unwrapping the second interference pattern after aligning a phase at a reference point of the first interference pattern with a phase at a reference point of the second interference pattern, converting the unwrapped second interference pattern into a second shape of the target, determining whether or not the first shape of the target coincides with the second shape of the target, and calculating the shape of the target by adding the integral multiple of a wavelength of the light source to the unwrapped second interference pattern in a case where it is determined that the first shape of the target does not coincide with the second shape of the target in the determining step.

A computer-readable recording medium as another method of the present invention is a computer-readable recording medium in which a program which makes the computer execute a measurement of a shape of a target using an interference pattern formed by a reference light from a reference surface and light from a target by light from light source is recorded. The program includes the steps of converting a first interference pattern into a first shape after obtaining the first interference pattern of the target, obtaining a second interference pattern at a position where the target moves in an optical axis direction of the reference surface, unwrapping the second interference pattern after aligning a phase at a reference point of the first interference pattern with a phase at a reference point of the second interference pattern, converting the unwrapped second interference pattern into a second shape of the target, determining whether or not the first shape of the target coincides with the second shape of the target, and calculating the shape of the target by adding the integral multiple of a wavelength of the light source to the unwrapped second interference pattern in a case where it is determined that the first shape of the target does not coincide with the second shape of the target in the determining step.

A measurement apparatus as another aspect of the present invention is a measurement apparatus configured to measure a shape of a target. The measurement apparatus includes a light source, a measurement unit configured to measure an interference pattern formed by reference light from a reference surface and light from the target using light from the light source, a calculating unit configured to calculate the shape of the target from the interference pattern measured by the measurement unit, and a moving mechanism configured to move the target in an optical axis direction of the reference surface.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

The present embodiment particularly relates to a measurement technology of an aspherical lens by an interferometer. A measurement method of the present embodiment measures a shape of a target using an interference pattern formed by reference light from a reference surface and light from the target by light from a light source.

The interferometer is an apparatus which measures a shape or a transmitted wavefront of a target by the interference of the reference surface and the target wavefront. The aspherical lens that is the target in the interference measurement method of the present embodiment is, for example, used as a lens for an exposure apparatus or a camera.

Figure 1:
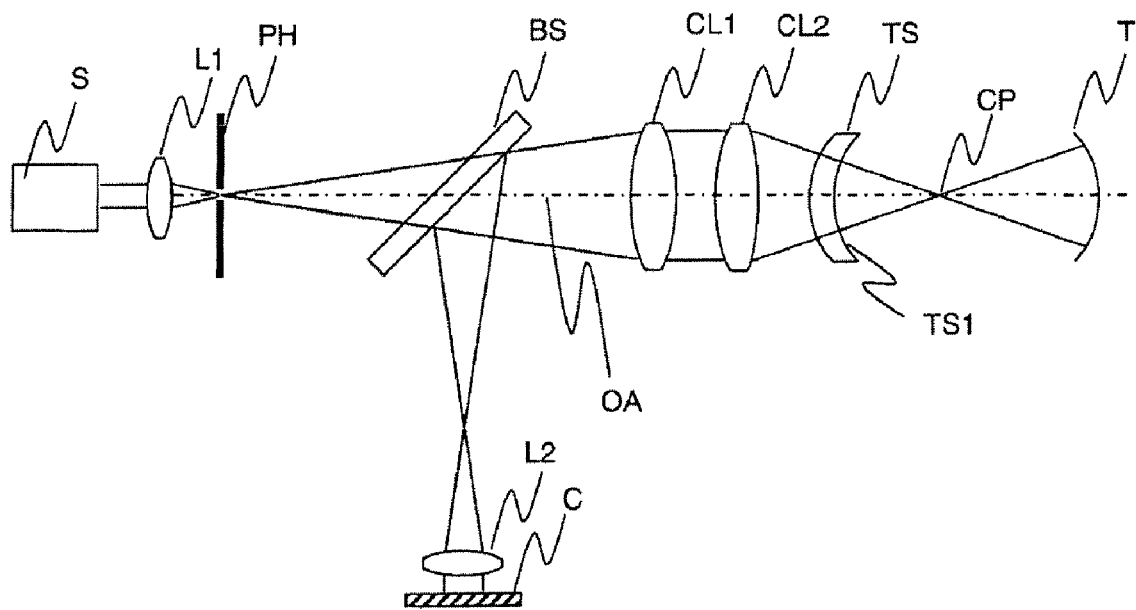
FIG. 1 is a view showing a configuration of an interferometer in the present embodiment.

FIG. 1 shows a configuration of an interferometer in the present embodiment. An interferometer 1 of the present embodiment is an interferometer for measuring an aspherical surface, which is what is called a Fizeau interferometer. The interferometer 1 has a quasi-monochromatic light source S. Light emitted from the light source S is condensed to a pinhole PH by a lens L1. Diverging light after transmitting through the pinhole transmits through a beam splitter BS and is converted into parallel light by a collimator lens CL1. The parallel light is condensed by a collimator lens CL2 to be a condensed light. The condensed light enters a reference spherical surface generating lens TS. Hereinafter, an optical axis of the reference spherical surface generating lens TS is represented as OA, and a z-direction is defined to be parallel to the optical axis.

The reference spherical surface generating lens TS reflects a part of light on a surface opposite to the light source S (a reflecting surface TS1). The light reflected by the reflecting surface TS1 becomes a reference surface (a reference waveform). The light reflected by the reflecting surface TS1 of the reference spherical surface generating lens TS transmits through the collimator lens CL2 and the collimator lens CL1, and is reflected by the beam splitter BS. After transmitting through the lens L2, the light reaches an image pickup device C.

On the other hand, the light transmitting through the reference spherical surface generating lens TS is condensed by a condensing position CP once, after that, it becomes diverging light and it enters the target T and is reflected by the target T. The light reflected by the target T is condensed by the condensing position CP once again, and it transmits through the reference spherical surface generating lens TS, the collimator lens CL2, and the collimator lens CL1, and further is reflected by the beam splitter BS. After transmitting through the lens L2, the light reaches the image pickup device C. Since the light reflected by the reference spherical surface generating lens TS and the light reflected by the target T interferes with each other, they form an interference pattern on the image pickup device C. A CCD is commonly used as the image pickup device C that is a measurement unit. It measures the interference pattern and sends its image data to a controller.

Figure 2A:
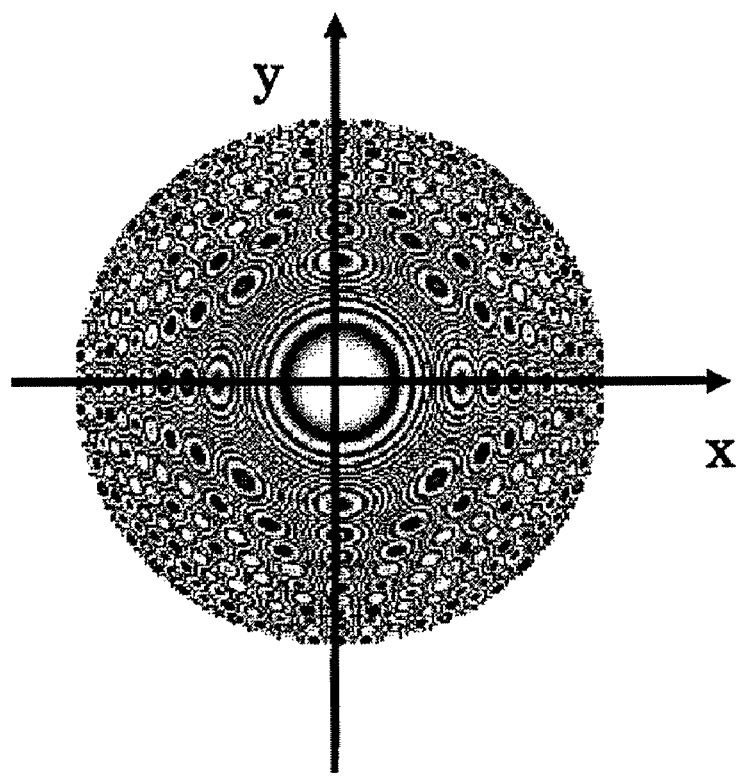
FIGS. 2A and 2B are views showing an interference pattern when an aspherical surface is measured by an interferometer.
Figure 2B:
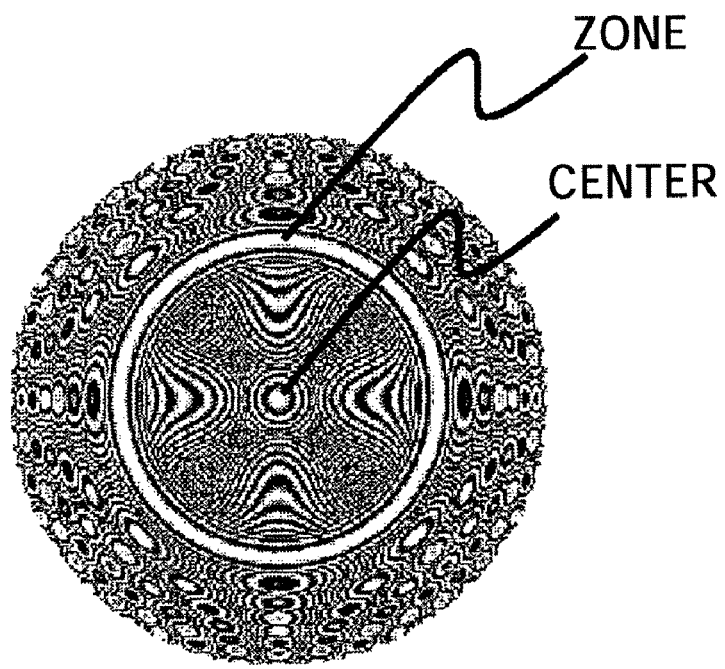

FIGS. 2A and 2B are views showing an interference pattern when an aspherical surface is measured by the interferometer 1. When the target T has a shape of an aspherical surface, an area where the density of the interference pattern is low and an area where the density of the interference pattern is high appear. For example, when the target T has a shape of an axisymmetric aspherical surface and the distance between the condensing position CP of the reference spherical surface generating lens TS and the target T is equal to a central radius of curvature of the target T, the interference pattern shown in FIG. 2A can be obtained.

Referring to FIG. 2A, a low-density interference pattern is formed in the center of the interference pattern. An area where a high-density interference pattern is formed includes what is called a moire pattern and it is not the interference pattern which reflects a shape of the target. An x-coordinate and a y-coordinate for the interference pattern are defined as shown in FIG. 2A, and hereinafter each of the x-coordinate and the y-coordinate for the interference pattern is common.

If the distance between the condensing position CP of the reference spherical surface generating lens TS and the target T is not identical to the central radius of curvature of the target, as shown in FIG. 2B, an annular interference pattern appears. Hereinafter, the annular interference pattern is referred to as a zone. Similarly, an area where a high-density interference pattern is formed includes the moire pattern and the interference pattern does not reflect the shape of the target.

Figure 3:
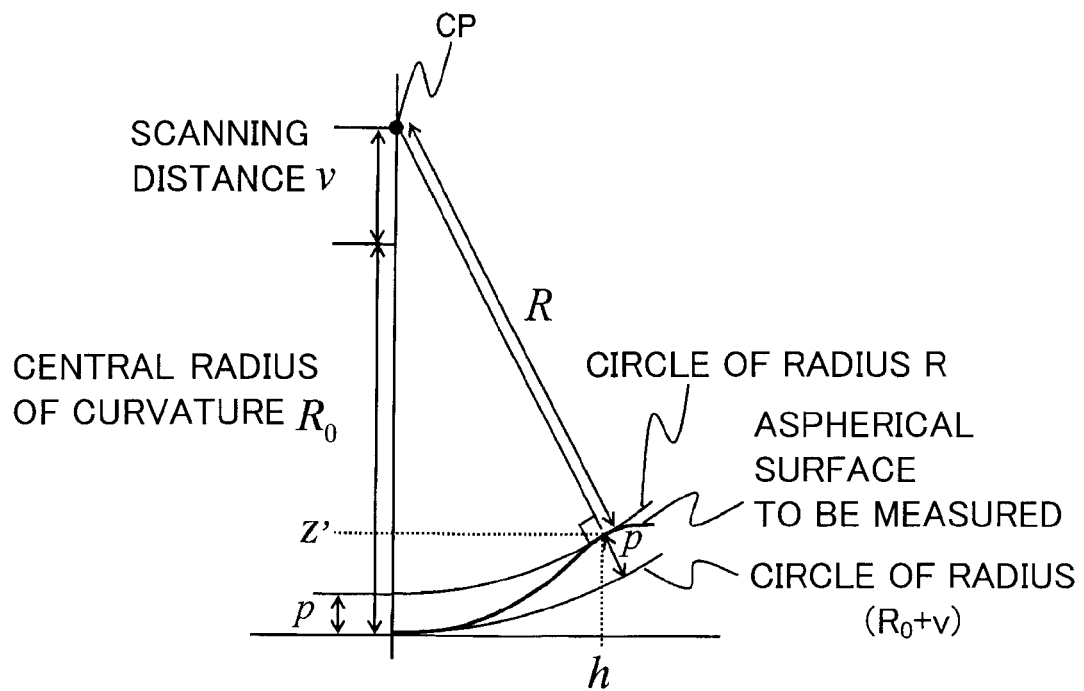
FIG. 3 is a view showing a relationship between an aspherical surface shape and an interference pattern in a conventional technology.

In U.S. Pat. No. 6,781,700 described above, the relationship between an aspherical surface shape and an interference pattern is represented by an expression. FIG. 3 is a view showing a relationship between the aspherical surface shape and the interference pattern disclosed in U.S. Pat. No. 6,781,700. Hereinafter, referring to FIG. 3, the principle regarding the disclosure of U.S. Pat. No. 6,781,700 will be described.

A central radius of curvature of the target is represented as R0 (a first measurement position of the target). When the distance between the condensing position CP of the reference spherical surface generating lens TS and the target T is R0, an interference pattern appears in the vicinity of the center of the target. For example, FIG. 2A shows such a state. Subsequently, when scanning by a scanning distance v (an amount of scanning from the first measurement position) in a z-direction is performed to obtain an interference pattern, an interference pattern shown in FIG. 2B can be obtained.

According to U.S. Pat. No. 6,781,700, a target shape, i.e. a surface shape z' for a distance h in a radial direction is provided by expressions 1 and 2.

(Expression 1)

$$z' = p + (R_0 + v - p)\frac{dp}{dv} \tag{1}$$

(Expression 2)

$$h = (R_0 + v - p)\sqrt{\frac{dp}{dv}\left(2 - \frac{dp}{dv}\right)} \tag{2}$$

Symbol "p" which is used in expressions 1 and 2 will be described. The distance between the condensing position CP of the reference spherical surface generating lens TS and the target T is represented as "R0+v". If the distance between the condensing position CP of the reference spherical surface generating lens TS and the zone is represented as R, "(R0+v)−R" corresponds to the "p".

In this case, an absolute value of "p" is greater than a half of a wavelength λ of the light source. According to U.S. Pat. No. 6,781,700, "p" can be measured with accuracy of an interferometer. However, if the absolute value of "p" is equal to or greater than λ/2, it can not be measured by a common interferometer. It is because when "n" is an integer and an absolute vale of "Δ" is equal to or lower than ½, "nλ+Δλ" is observed as "Δλ" in a common monochromatic interferometer. Commonly, the integer n is estimated using a method called an unwrapping. In other words, focusing on a certain pixel, the integer n is estimated so that the pixel can be consistent with peripheral pixels, i.e. the pixels on the left, right, top, and bottom. However, as shown in the interference pattern of FIG. 2B, the density of the interference pattern is too high to unwrap. Therefore, in order to measure the value of "p", an advanced interferometer is necessary.

Furthermore, U.S. Pat. No. 6,781,700 discloses that "dp/dv" can be obtained by a numerical calculation. However, in order to obtain the value of "dp/dv", an advanced processing is necessary.

In Japanese Patent Laid-Open No. 2004-45168, an aspherical surface shape is measured using a phenomenon that a low-density interference pattern appears in the center and the zone. When the target is scanned, the position of the zone is changed. When a plurality of interference patterns are obtained while the target is scanned, a phase in the center of each of the interference patterns can be regarded as an offset. Thus, an offset correction can be performed for each of the interference patterns.

Japanese Patent Laid-Open No. 2004-45168 discloses that an aspherical surface shape can be measured by performing a correction of 2 πn for each of zones and superimposing the zones after the offset correction is completed. However, because the target is scanned, the magnification varies between each of the interference patterns and the correspondence between a coordinate on a CCD surface and a coordinate of the target varies between each of the interference patterns. Therefore, when the scanning distance v (displacement) of the target is small, the method disclosed in Japanese Patent Laid-Open No. 2004-45168 can be approximately performed. However, when the scanning distance v of the target is large, a measurement error may occur in the method disclosed in Japanese Patent Laid-Open No. 2004-45168.

Figure 4:
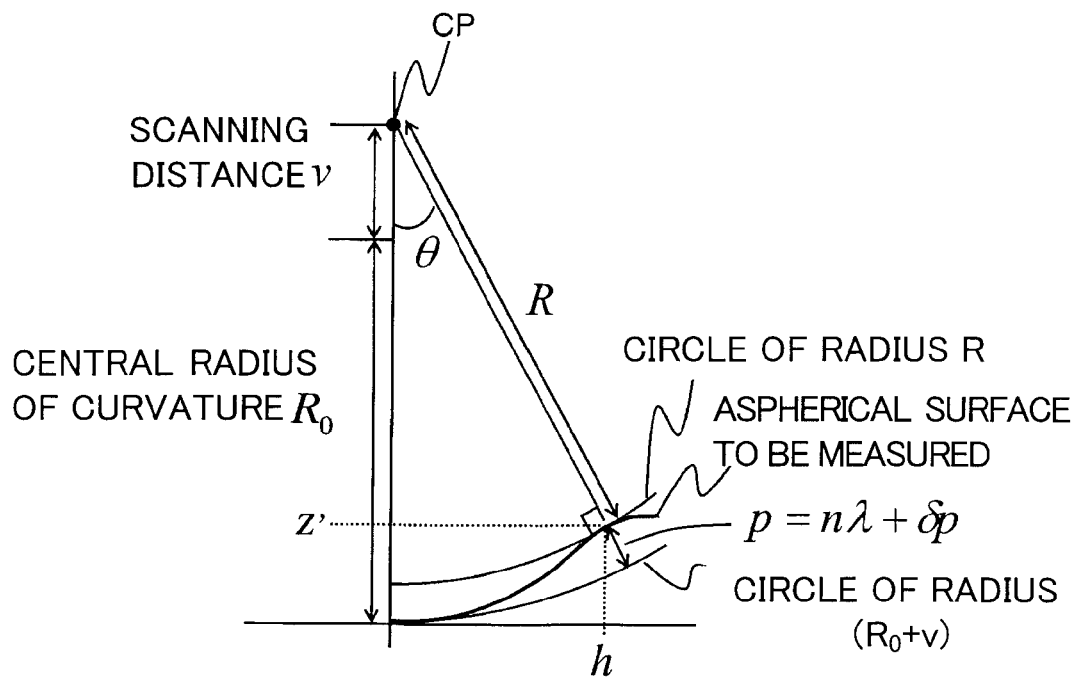
FIG. 4 is a view showing a relationship between an aspherical surface shape and an interference pattern in the present embodiment.

In the present embodiment, an aspherical surface shape is measured by a relatively-simple measurement method and processing. Referring to FIG. 4, the basic concept of the present embodiment will be described.

FIG. 4 is a view showing a relationship between an aspherical surface shape and an interference pattern in the present embodiment. In accordance with FIG. 4, a distance h in a radial direction and a surface shape z' with respect to the distance h (the distance in a height direction) are calculated by expressions 3 and 4.

(Expression 3)

$$z' = R_0 + v - [R_0 + v - (n\lambda + \delta p)]\cos\theta \tag{3}$$

(Expression 4)

$$h = [R_0 + v - (n\lambda + \delta p)]\sin\theta \tag{4}$$

In expression 3 and 4, symbol "θ" represents an angle between a line connecting the condensing position CP of the reference spherical surface generating lens TS with the interference pattern and an optical axis. Symbol "δp" represents a value of a length obtained by converting a phase obtained from the interference pattern based on a wavelength of the light source S. In other words, it is a value of length unit obtained by converting the phase measured by the interference pattern. Symbol "R0" represents a distance between the condensing position CP of the reference spherical surface generating lens TS and the center of the target. The symbol "R0" can be easily analyzed if it is set to the central radius of curvature of the target.

The symbol "δp" can be obtained from the interference pattern, and the symbol "e" can be learned from a setting value of an optical system in the interferometer. Therefore, in expressions 3 and 4, unknown symbols are "z'", "h", and "n". Since the number of equations is fewer than the number of the unknown symbols, expressions 3 and 4 can not be commonly solved. However, using a limitation that the symbol "n" is an integer, the value of "n" can be determined.

Next, specifically, a method for calculating the integer "n" will be described.

In the present embodiment, as the light source S, a stabilized He—Ne laser (a wavelength λ=633 nm) is used. The target is assumed to have a shape of an axisymmetric aspherical surface. The target has a convex shape and a radius of curvature of 20.75 mm in the vicinity of the center. An effective diameter of the target is 20.00 mm.

Figures 5A, 5B, 5C:
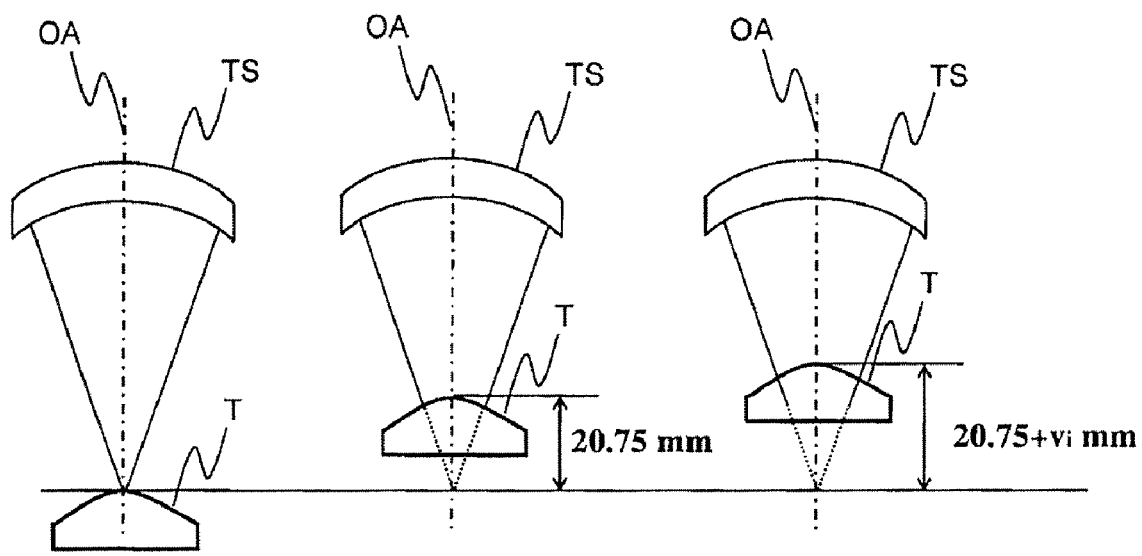
FIGS. 5A to 5C are views schematically showing a scanning state of a target in the present embodiment.

FIGS. 5A to 5C are views schematically showing a scanning state of a target in the present embodiment.

First, as shown in FIG. 5A, a top of the target T is positioned at the condensing position CP of the reference spherical surface generating lens TS (a cat's eye position). A method for positioning the top of the target T at the condensing position CP of the reference spherical surface generating lens TS will be described. The interference pattern formed by reflected light from the target T and reflected light from the reference spherical surface generating lens TS is obtained by the image pickup device C. After the interference pattern is unwrapped, it is fitted into a Zernike polynomial. When a defocusing component (fourth term) of the Zernike polynomial is substantially equal to zero, the top of the target T coincides with the condensing position of the reference spherical surface generating lens TS.

Subsequently, as shown in FIG. 5B, the target T is moved to a first position. At the first position, the distance between the reference spherical surface generating lens TS and the target T is equal to the radius of curvature (20.75 mm: a central radius of curvature) in the vicinity of the center of the target. In other words, the symbol "R0" is set to 20.75 mm. After that, a first interference pattern is obtained.

Furthermore, the target T moves by a scanning distance vi (i>1) to obtain the first interference pattern. While the value of "i" is greater than 1, the value of "v1" is set to equal to 0 when the value of "i" is equal to 1.

FIGS. 6A to 6E are interference patterns obtained by moving the target T in the present embodiment. Each of the interference patterns shown in FIGS. 6A to 6E differs in the scanning distance vi (displacement). The interference patterns in FIGS. 6A to 6E correspond to v1=0.0000 mm, v2=0.6153 mm, v3=1.0756 mm, v4=1.4629 mm, and v5=1.8001 mm, respectively.

FIGS. 7A to 7E are graphs which are obtained by unwrapping the interference patterns of FIGS. 6A to 6E, respectively, and plotting a cross section of y=0. The unwrapping is performed so that the center of the interference pattern is zero. The term "unwrapping" means that phases are joined and connected if a phase jump occurs between adjacent points. As an unwrapping processing, generally, a flood-fill method is often used.

When the unwrapping processing is performed, a reference point common to each of interference patterns is set so that the phase at the reference point in each of the interference patterns is always the same value. In a case of an axisymmetric aspherical surface, an interference pattern certainly appears in the center of the measured image. Therefore, in the present embodiment, the center of each of interference patterns is set as a reference point so that the phase at the reference point of each of the interference patterns is 0. Data in an area where the density of the interference pattern is too high to unwrap are invalid data (0).

Figure 6A:
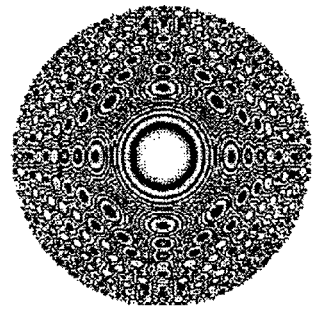
FIGS. 6A to 6E are views showing an interference pattern obtained by changing an amount of scanning in the present embodiment.
Figure 6B:
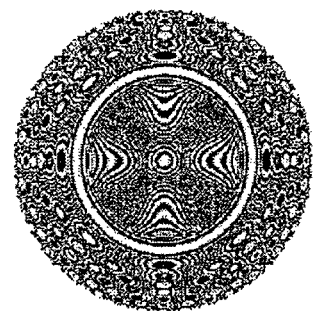
Figure 6C:
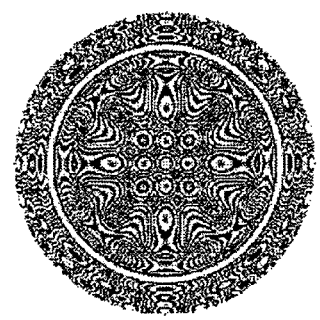
Figure 6D:
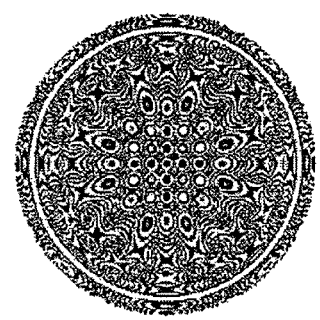
Figure 6E:
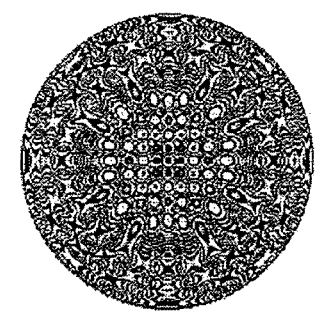

In FIGS. 6D and 6E, since the density of the interference pattern between the center and the zone is high, the area between the center and the zone can not be unwrapped. Therefore, in FIGS. 7D and 7E, although interference pattern information can be obtained in two parts of a center part and a zone part, the correlation between the center part and the zone part is lost. However, as described later, according to the present embodiment, the correlation between the center part and the zone part can be recovered.

Figure 7A:
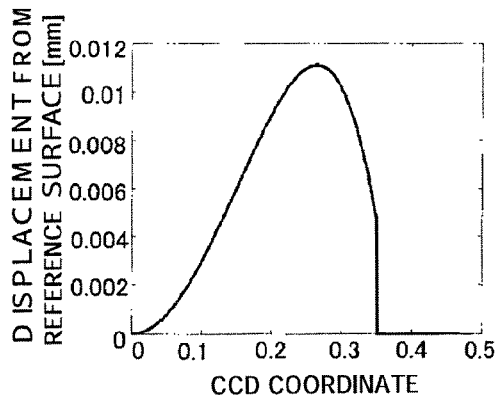
FIGS. 7A to 7E are graphs which are obtained by an unwrapping processing of interference patterns of FIGS. 6A to 6E and plotting a cross section of y=0.
Figure 7B:
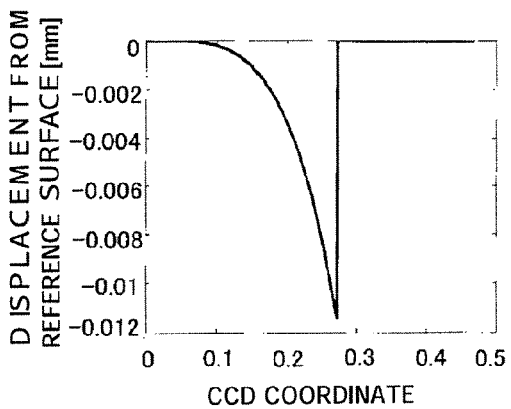
Figure 7C:
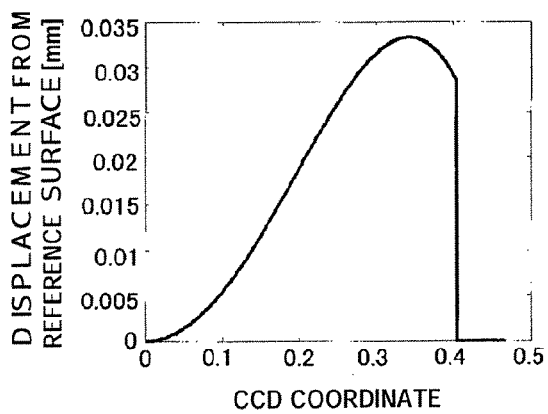
Figure 7D:
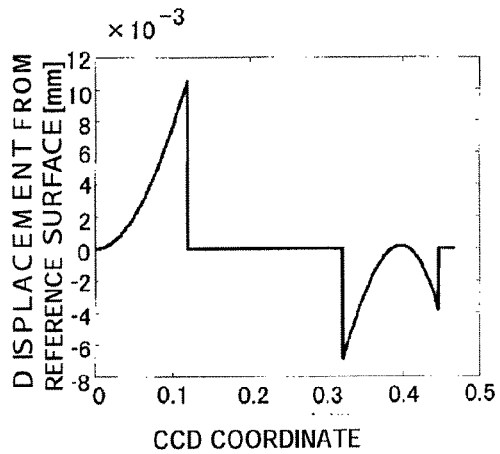
Figure 7E:
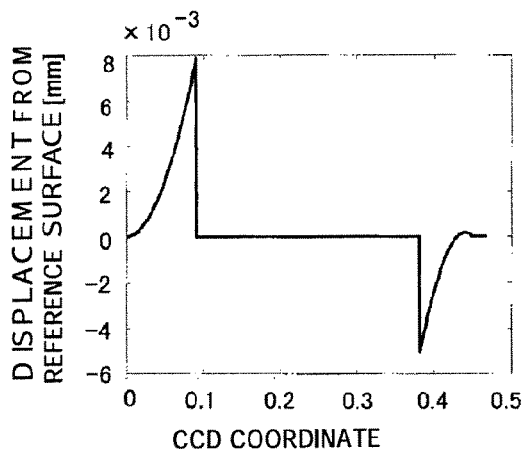
Figure 8A:
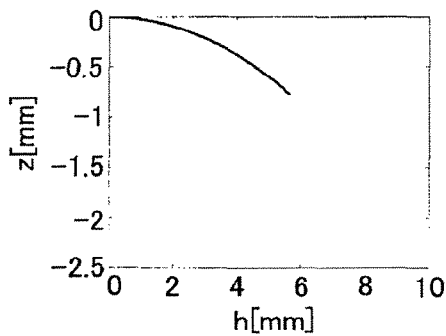
FIGS. 8A to 8G are views showing a shape of a target converted from interference patterns of FIGS. 7A to 7E.
Figure 8B:
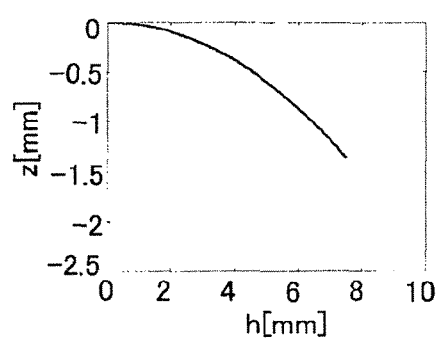
Figure 8C:
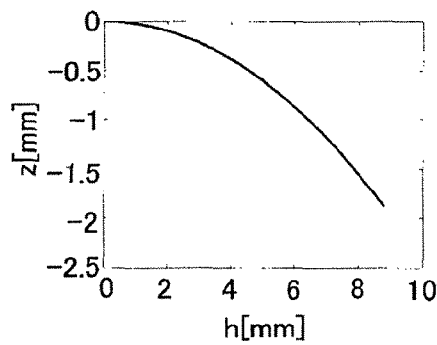
Figure 8D:
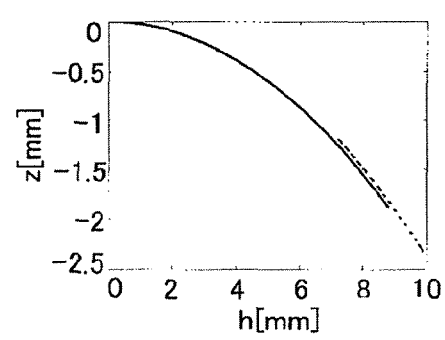
Figure 8E:
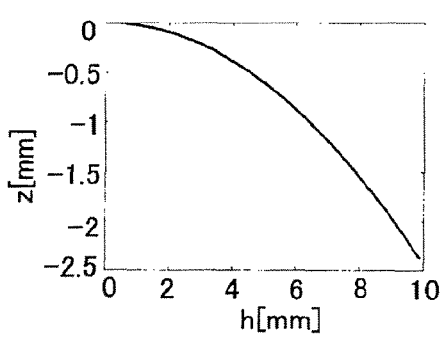
Figure 8F:
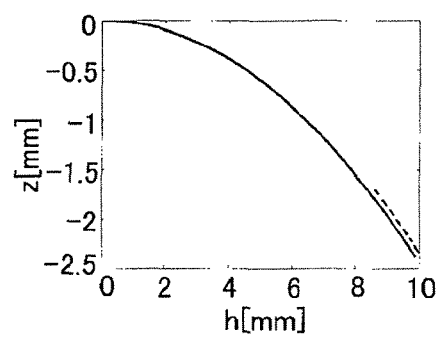
Figure 8G:
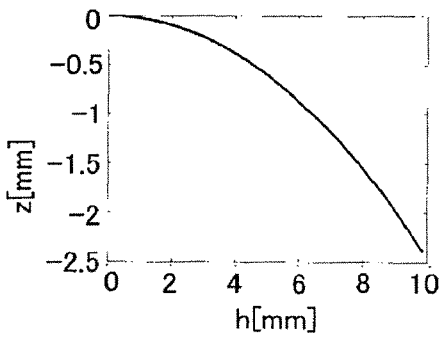

FIGS. 8A to 8G are views showing a shape of the target T obtained from FIGS. 7A to 7E using expressions 3 and 4. FIGS. 8A to 8D and 8F are views obtained from FIGS. 7A to 7E obtained by unwrapping each of the interference patterns and converted into a shape of the target T when the integer "n" of expressions 3 and 4 is 0, respectively. FIGS. 8E and 8G are views of a shape of the target obtained after the value of the integer "n" is adjusted.

FIG. 8A is a result obtained by converting the view of FIG. 7A by expressions 3 and 4. Referring to FIG. 8A, the shape of the target can be recovered or calculated up to h≈5.6 mm.

When converting the view of FIG. 7B using expressions 3 and 4, as shown in FIG. 8B, the shape can be recovered up to h≈7.5 mm. The shape up to h≈5.6 mm has been already calculated from the view of FIG. 7A. Therefore, the shape up to h≈5.6 mm is obtained by an average of the value of FIG. 8A and the value calculated from FIG. 7B. The shape in an area more than h≈5.6 mm is obtained by using only the value calculated from FIG. 7B. As a result, FIG. 8B is obtained.

When converting the view of FIG. 7C using expressions 3 and 4, the shape of the target can be recovered up to h≈8.8 mm. The shape up to h≈7.5 mm has been already calculated. Therefore, similarly to FIG. 8B, the shape up to h≈7.5 mm is obtained by an average of the value of FIG. 8B and the value already calculated. With regard to the shape in an area more than h≈7.5 mm, using a result calculated from FIG. 7C, FIG. 8C can be obtained.

The problem is the case where the view of FIG. 7D is converted by using expressions 3 and 4. If the view of FIG. 7D is simply converted by using expression 3 and 4, the result of FIG. 8D is obtained. A dotted line in FIG. 8D shows a shape converted from the zone part. It is apparent that it does not coincide with the shape recovered by the view of FIG. 8C.

Therefore, the integer "n" of expressions 3 and 4 needs to be adjusted. In this case, when the integer "n" is 97, as shown in FIG. 8E, the shape converted from the zone part of FIG. 7D can coincide with the shape recovered by FIG. 8C. With regard to the area where the shape of the target recovered by FIG. 8C coincides with the shape of the target calculated from FIG. 7D on condition that the integer "n" is 97, these average is calculated.

Thus, the shape can be recovered up to h≈9.8 mm. Since the symbol "n" is an integer, the adjustment of the symbol "n" may be performed by increasing or decreasing the symbol "n" by 1 at a time, and the interference pattern may be converted into the shape of the target based on expressions 3 and 4. By doing this, the shape recovered by FIG. 8C certainly coincides with the result obtained by converting the view of FIG. 7D into the shape.

Instead, if a value of the difference between the shape recovered by FIG. 8C and the result obtained by calculating the shape in FIG. 7D on condition that the value of "n" is 0 (the difference between the solid line and the dotted line in FIG. 8D) multiplied by $\cos\theta$ is divided by a wavelength $\lambda$, the integer "n" can be estimated with high accuracy.

Similarly, when FIG. 7E is converted by expressions 3 and 4, the view of FIG. 8F can be obtained. The dotted line in FIG. 8F is a shape converted from the zone part, and it does not coincide with the shape of the target recovered by FIG. 8E. However, if the integer "n" is 146 in expressions 3 and 4, as shown in FIG. 8G, it can coincide with the shape recovered by FIG. 8E.

With regard to an area where the shape of the target recovered by FIG. 8E coincides with the shape of the target obtained by FIG. 7E on condition that the integer "n" is 146, the average is calculated by superimposing these shape. Furthermore, by averaging the superimposed area, the shape can be recovered up to h≈10.0 mm. The method for estimating the integer "n" is as described above.

By using a method described above, an aspherical surface shape can be accurately measured with an easy processing.

Figure 9:
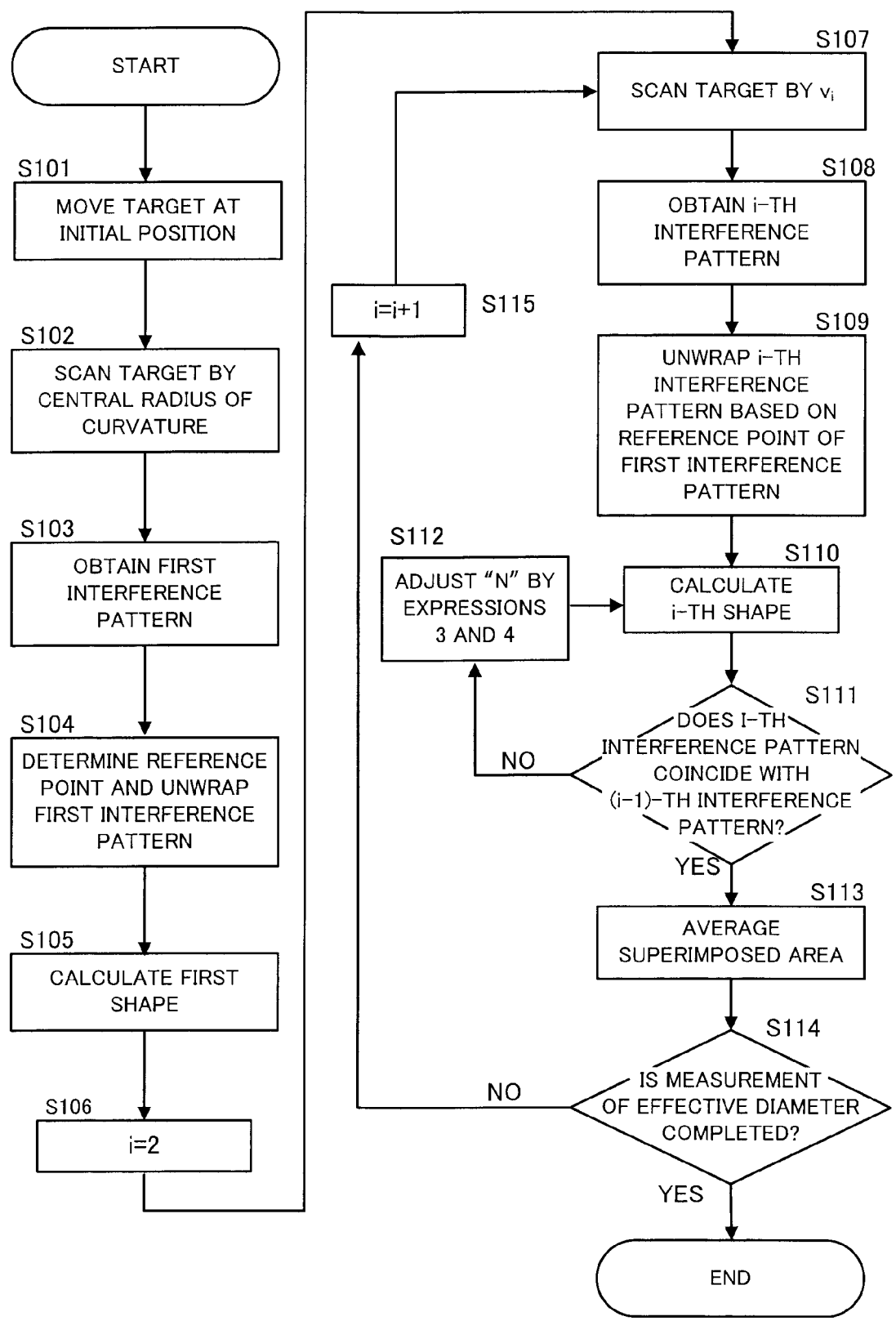
FIG. 9 is a flowchart of an interference measurement method in the present embodiment.

Next, generalizing an interference measurement method in the present embodiment, with reference to FIG. 9, the present embodiment will be described in detail. FIG. 9 is a flowchart of an interference measurement method which analyzes an interference pattern of reflected light from a reference surface and a target and measures a shape of the target in the present embodiment.

Figure 10:
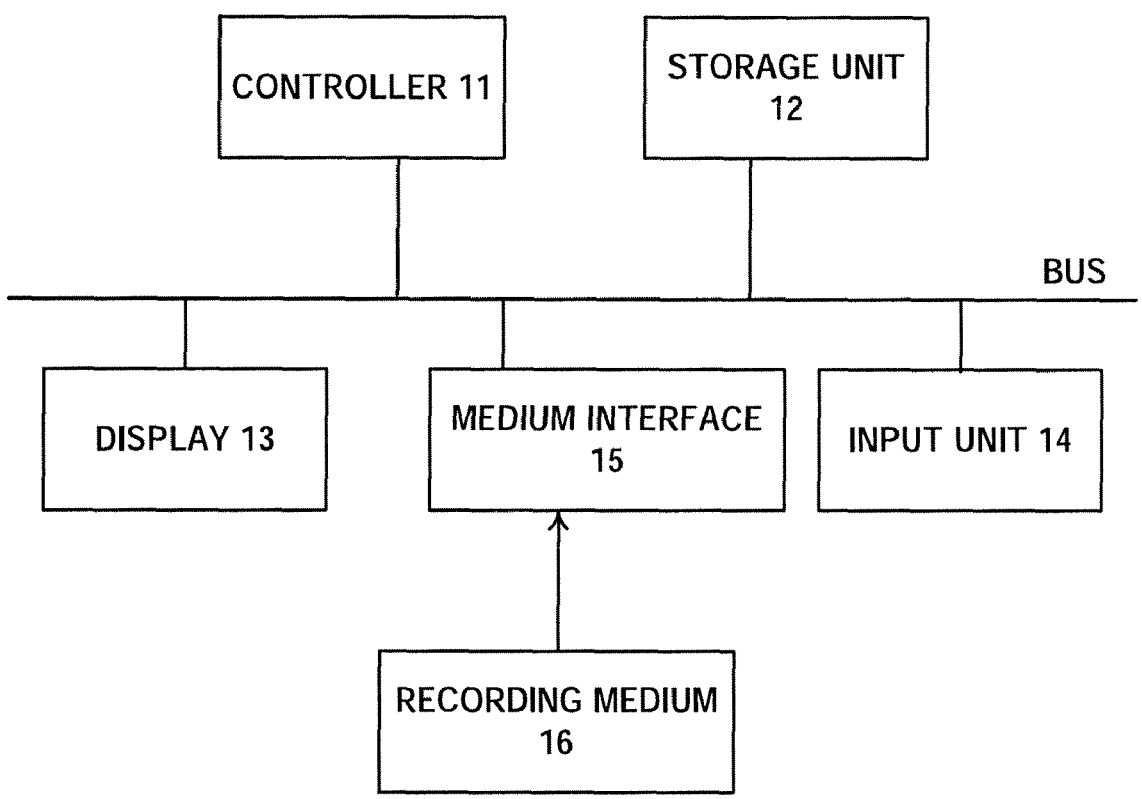
FIG. 10 is a view showing a configuration of a computer.

FIG. 10 is a view showing a configuration of a computer 10 for executing the interference measurement method as described later. The computer 10 includes a controller 11, a storage unit 12, a display 13, an input unit 14, and a medium interface 15. The controller 11, the display 13, the storage unit 12, the input unit 14, and the medium interface 15 are interconnected to one another via a bus line. The medium interface 15 is configured to connect a recording medium 16 readable by a computer. The controller 11 is for example a CPU, a GPU, a DSP or a microcomputer, further includes a cash memory for temporary storage. The storage unit 12 is for example a memory or a hard disk. The medium interface 15 is for example a CD-ROM drive or a USB interface. The recording medium 16 is for example a CD-ROM or a USB memory.

In an interference measurement method in the present embodiment, first, a measurement start command is inputted from the input unit 14. In Step S101, the controller 11 commands a drive mechanism to move the target at a default position. If a power component of the target needs to be accurately measured, it is desirable that the default position of the target is set at a cat's eye position where light emitted from a reference surface is condensed.

Next, in Step S102, the drive mechanism scans the target which is positioned at the default position by the command from the controller 11 to move in an optical axis direction by a radius of curvature in the center of the target. Therefore, a first scanning position is positioned at a position which is a central radius of curvature away from the cat's eye position at which the reference surface is condensed. The interference measurement apparatus of the present embodiment includes the drive mechanism (a moving mechanism) configured to drive (move) the target in the optical axis direction and a measurement mechanism (a measurement unit) configured to measure an amount of the drive by the drive mechanism. Therefore, the target is movable in the optical axis direction by a distance determined by the drive mechanism. The drive mechanism and the measurement mechanism are controlled by the controller 11 and measurement data obtained by the measurement mechanism is transmitted to the controller 11.

After the target moves by the central radius of curvature from the default position, in Step S103, a first interference pattern formed by lights reflected from the reference surface and the target is obtained. As a method for obtaining the interference pattern, any method can be used. As a well-known method, for example, there is a phase shift method. The data obtained by the image pickup device C are transmitted to the controller 11 (the storage unit 12) and stored in the memory.

After the first interference pattern is obtained, in Step S104, the controller 11 as a calculating unit performs an unwrapping processing of the first interference pattern. As the unwrapping processing, a well-known processing method other than the flood-fill method may also be used. When the unwrapping processing is performed, it is necessary to determine a reference point and save the phase at this reference point. In the case where the target has a shape of an axisymmetric aspherical surface, it is more preferable that a center of the interference pattern is set as the reference point.

Next, in Step S105, the controller 11 converts the unwrapped first interference pattern into a shape of the target using expression 3 and 4. In this case, the value of "n" of each expression may be set to 0.

By Steps S101 to S105 described above, an initial measurement movement of the interference measurement method in the present embodiment is completed. In the initial measurement movement, the first interference pattern of the target is obtained and is converted into a first shape of the target. When the initial measurement movement is completed, in Step S106, the value of "i" (a natural number) is set to 2.

Next, in Step S107, the drive mechanism moves the target in the optical axis direction by a scanning distance Vi (displacement). The scanning distance Vi is determined so that a zone in an i-th interference pattern and a zone in an (i−1)-th interference pattern are superimposed on each other. For example, it is determined so that zones in a first interference pattern and a second interference pattern are superimposed on each other. When the target moves by the scanning distance Vi, in Step S108, the i-th interference pattern is obtained (stored) by the image pickup device C and the controller 11 (the storage unit 12). Thus, in Steps S107 and S108, the target is scanned in the optical axis direction of the reference surface and the i-th interference pattern is obtained at an i-th scanning position (the value of "i" is a natural number equal to or greater than 2).

In Step S109, the controller performs the unwrapping processing of the i-th interference pattern obtained in Step S108. When the i-th interference pattern is unwrapped, the phase at the reference point is adjusted so as to be equal to the phase of the reference point of the first interference pattern saved in Step S104. This is because an offset between the phases of the reference points of the first interference pattern and the i-th interference pattern (the center point of the interference pattern) needs to be corrected. Thus, in Step S109, the phase of the first interference pattern at the reference point is aligned to the phase of the i-th interference pattern at the reference point, and the i-th interference pattern is unwrapped.

In Step S110, the controller calculates the shape of the target from the i-th interference pattern unwrapped in Step S109 using expressions 3 and 4. In this case, "0" is substituted in the symbol "n" of each expression. Thus, in Step S110, the unwrapped i-th interference pattern is converted into an i-th shape of the target.

Next, in Step S111, the controller compares the shape of the target converted from the i-th interference pattern with the shape of the target already converted from the (i−1)-th interference pattern. In the embodiment, it is determined whether or not the (i−1)-th shape of the target coincides with the i-th shape of the target in a superimposed area of the (i−1)-th and the i-th shapes. The coincidence of the shape includes the case where the (i−1)-th and the i-th shapes are considered to be substantially coincide with each other in addition to the case where these shapes are completely coincide with each other.

As represented by a solid line and a dotted line in FIGS. 8D and 8E, the (i−1)-th shape and the i-th shape of the target include an area where these shapes are superimposed on each other with respect to the distance h in the radial direction of the target. Therefore, whether or not the (i−1)-th shape of the target coincides with the i-th shape of the target is determined by an average of square sum of the difference in this superimposed area at a plurality of points (distance h). If the average of square sum is smaller than a predetermined threshold value, it is determined that the (i−1)-th shape coincides with the i-th shape.

If it is determined that these shapes do not coincide with each other, the controller proceeds to Step S112.

In Step S112, when the controller calculates expressions 3 and 4, it adjusts the value of "n" in each expression and obtains the shape of the target from the i-th interference pattern. Here, a method for adjusting the value of "n" will be described in detail. First, there is a limitation that the value of "n" is an integer. Therefore, if the value of "n" is increased or decreased by 1 at a time and Steps S110, S111, and S112 are repeated, the i-th shape of the target certainly coincides with the (i−1)-th shape of the target by a certain integer "n".

Whether or not the i-th shape coincides with the (i−1)-th shape is, as described above, obtained from the average of square sum of the difference at the plurality of points in the superimposed area. When the calculation is performed by increasing or decreasing the value of "n" by 1 at a time and the average of square sum is smaller than a predetermined threshold value, it can be determined that the shapes coincide with each other by the value of "n" at that time. Instead, when a plurality of averages of square sum are calculated using a plurality of values of "n" and the value of "n" by which a maximum value (a local minimum value) is obtained is calculated, it is also determined that the shapes coincide with each other. Step S112 is repeated until the i-th shape coincides with the (i−1)-th shape.

Thus, in Step S112, if the (i−1)-th shape of the target does not coincide with the i-th shape of the target, integral multiple of the wavelength of the light source is added to the unwrapped i-th interference pattern in order to convert it into the i-th shape so as to coincide in the superimposed area.

Instead of using the average of square sum, the value of "n" can also be estimated with high accuracy by dividing the value of the difference between the i-th interference pattern and the (i−1)-th interference pattern multiplied by $\cos\theta$ by a wavelength $\lambda$. In this case, without repeating Step S112, the value of "n" by which the shapes coincide with each other can be obtained.

In Step S111, when it is determined that the (i−1)-th shape of the target coincides with the i-th shape of the target, the controller proceeds to Step S113. In Step S113, the controller superimposes the (i−1)-th shape of the target on the i-th shape of the target and averages their superimposed area. By this averaging processing, an influence of a measurement error such as a noise can be reduced.

In Step S114, the controller determines whether or not all areas of an effective diameter of the target have been measured based on the distance h obtained from expression 4. If the measurement for all areas of the effective diameter of the target is completed, the measurement processing is finished. If the measurement for all areas of the effective diameter of the target is not completed, the controller proceeds to Step S115.

In Step S115, a value obtained by adding "1" to "i" is newly set as "i", and the controller proceeds to Step S107. From Step S107, the measurement processing as described above is repeated. In Step S114, if it is determined that the measurement for the all areas of the effective diameter of the target is completed, the controller finishes the measurement processing. The shape data of the target obtained by the measurement is displayed on the display 13.

The interference measurement method of the present embodiment is as described above. One of the differences between the present embodiment and a technology of U.S. Pat. No. 6,781,700 is that an expression for converting the interference pattern into the shape is different. Furthermore, in U.S. Pat. No. 6,781,700, it is assumed that the correlation between the center part and the zone part is known. On the other hand, in the present embodiment, the correlation between the center part and the zone part does not have to be known.

One of the differences between the present embodiment and Japanese Patent Laid-Open No. 2004-45168 is that there is a step for converting the interference pattern into the shape. In other words, in the flowchart shown in FIG. 9, the existence of Steps S105 and S110 is a difference between the present embodiment and Japanese Patent Laid-Open No. 2004-45168. By the existence of the steps for converting the interference pattern into the shape, the measurement accuracy of the interference measurement method can be improved.

In the present embodiment, by accurately measuring the amount of scanning of the target, the measurement accuracy of the target can be improved. Therefore, a length measurement means such as a laser length measurement machine needs to be provided. The length of scanning of the target needs to be measured at least two points so that the target is not tilted during scanning the target.

Although a Fizeau-type interferometer is described in the present embodiment, the measurement method described above can also be applied to a point diffraction interferometer other than the Fizeau-type interferometer.

The method (step) for measuring the shape of the target described above, i.e. Steps S101 to S114 shown in FIG. 9, can also be executed by a computer in accordance with a program. In this case, the program described above is installed in the computer via the recording medium 16 in which the program has been recorded or the medium interface 15 from an external computer, and is stored in the storage unit 12.

According to the present embodiment described above of the present invention, an interference measurement method which is configured to measure an aspherical surface shape with simple processing without an approximate calculation can be provided.

Furthermore, according to the present embodiment described above of the present invention, a program for performing the interference measurement method described above by a computer and an interference measurement apparatus which is configured to perform the interference measurement method described above can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-341369, filed on Dec. 28, 2007, which is hereby incorporated by reference herein in its entirety.

What is claimed is:

1. A measurement method for measuring a shape of a target using an interference pattern formed by reference light from a reference surface and light from the target by light from a light source, the measurement method comprising the steps of:
    converting a first interference pattern into a first shape of the target after obtaining the first interference pattern of the target;
    obtaining a second interference pattern at a position where the target moves in an optical axis direction of the reference surface;
    unwrapping the second interference pattern after aligning a phase at a reference point of the first interference pattern with a phase at a reference point of the second interference pattern;
    converting the unwrapped second interference pattern into a second shape of the target;
    determining whether or not the first shape of the target coincides with the second shape of the target; and
    calculating the shape of the target by adding the integral multiple of a wavelength of the light source to the unwrapped second interference pattern in a case where it is determined that the first shape of the target does not coincide with the second shape of the target in the determining step.

2. A measurement method according to claim 1, wherein the shape of the target is an axisymmetric aspherical surface.

3. A measurement method according to claim 1, wherein the reference point of the first interference pattern is positioned at a center of the interference pattern.

4. A measurement method according to claim 1, wherein the first interference pattern is obtained in a state where the target is positioned at a position away from a condensing position on the reference surface by a central radius of curvature of the target.

5. A measurement method according to claim 1,
wherein the measurement method estimates an integer n and calculates z' and h using the following two expressions, $$z' = R_0 + v - [R_0 + v - (n\lambda + \delta p)] \cos \theta$$

$$h = [R_0 + v - (n\lambda + \delta p)] \sin \theta$$

where, h is a distance of the target in a radial direction, z' is a distance in a height direction, $R_0$ is a first measurement position of the target, v is a scanning distance from the first measurement position, $\theta$ is an angle between a line formed by connecting the condensing position at the reference surface and the interference pattern and the optical axis, $\delta p$ is a value obtained by converting a phase measured by the interference pattern into unit of length, and $\lambda$ is a wavelength of the light source.

6. A computer-readable recording medium in which a program which makes the computer execute a measurement of a shape of a target using an interference pattern formed by a reference light from a reference surface and light from a target by light from light source is recorded, the program comprising the steps of:

converting a first interference pattern into a first shape of the target after obtaining the first interference pattern of the target;

obtaining a second interference pattern at a position where the target moves in an optical axis direction of the reference surface;

unwrapping the second interference pattern after aligning a phase at a reference point of the first interference pattern with a phase at a reference point of the second interference pattern;

converting the unwrapped second interference pattern into a second shape of the target;

determining whether or not the first shape of the target coincides with the second shape of the target; and calculating the shape of the target by adding the integral multiple of a wavelength of the light source to the unwrapped second interference pattern in a case where it is determined that the first shape of the target does not coincide with the second shape of the target in the determining step.

7. A measurement apparatus configured to measure a shape of a target, the measurement apparatus comprising:

a light source;

a measurement unit configured to measure an interference pattern formed by reference light from a reference surface and light from the target using light from the light source;

a calculating unit configured to calculate the shape of the target from the interference pattern measured by the measurement unit; and a moving mechanism configured to move the target in an optical axis direction of the reference surface, wherein the calculating unit converts a first interference pattern of the target measured by the measurement unit into a first shape of the target, wherein the calculating unit unwraps a second interference pattern after aligning a phase at a reference point of the first interference pattern with a phase at a reference point of the second interference pattern which is obtained at a position where the target moves in an optical axis direction of the reference surface and converts the unwrapped second interference pattern into a second shape of the target, and wherein the calculating unit determines whether or not the first shape of the target coincides with the second shape of the target and calculates the shape of the target by adding the integral multiple of a wavelength of the light source to the unwrapped second interference pattern in a case where it is determined that the first shape of the target does not coincide with the second shape of the target.

8. A measurement apparatus according to claim 7, further comprising a measurement mechanism configured to measure a displacement by the moving mechanism.

* * * * *